Aug. 25, 1953     C. A. ODING     2,649,689
ROTARY HYDRAULIC COUPLING
Filed Sept. 8, 1949     2 Sheets-Sheet 1

INVENTOR.
CARL A. ODING
BY
ATTORNEY

Aug. 25, 1953  C. A. ODING  2,649,689
ROTARY HYDRAULIC COUPLING
Filed Sept. 8, 1949  2 Sheets-Sheet 2

INVENTOR.
CARL A. ODING
BY
*W. H. Atkinson*
ATTORNEY

Patented Aug. 25, 1953

2,649,689

UNITED STATES PATENT OFFICE 2,649,689

ROTARY HYDRAULIC COUPLING

Carl A. Oding, Alameda, Calif., assignor, by direct and mesne assignments, to Planamatic Corporation, Oakland, Calif., a corporation of California Application September 8, 1949, Serial No. 114,530

12 Claims. (Cl. 60—54)

My present invention relates to hydraulic couplings of the kinetic energy type, in which an energy transmitting fluid is circulated in a vortex chamber formed between two opposed coupling members and more particularly to an improved type of fluid coupling or clutch in which the quantity of fluid in the vortex chamber formed between its driving and driven members may be varied to control the slip and/or torque transmitting ability of the coupling.

In couplings of the hydraulic type it is desirable that means be provided for varying the amount of liquid in the vortex or working chamber formed between the driving and driven members of the coupling and thus selectively control the operating characteristics of the coupling.

In the prior art there is shown several methods by which the above control of fluid in the coupling can be obtained. The most common procedure is to permit the escape of oil or other fluid through a constricted outlet at the perimeter of the vortex chamber and then regulate the flow of a fluid thereto by a variable pumping means which will compensate for this loss of fluid and thus maintain a working level of fluid in the vortex chamber. In another arrangement to maintain a proper level of fluid in the coupling and compensate for any loss of fluid from the vortex chamber there is a fluid collecting chamber with a scoop-like conduit that may be adjusted to pick up the fluid thus collected and return it to the vortex chamber of the coupling. In this manner any amount of fluid that is required for a particular load is maintained in the vortex chamber. Normally, couplings of this type are operated with the vortex chamber completely filled but where a difference in speed between the driving and driven members becomes important as in initially connecting a load to a source of power and/or for the purpose of maintaining a difference in speed between the driving and driven members, these couplings may be operated with the vortex chamber only partially filled. Under such conditions the amount of operating fluid in the vortex chamber will determine the slip between the driving and driven members. In other words, as the operating fluid is withdrawn from the vortex chamber the slip between the driving and driven members will increase. By the same token, as the vortex chamber is filled up, the driving and driven members will come into rotation at more nearly the same speeds. In an efficient fluid coupling under full load conditions and with the vortex chamber completely filled, the normal slip will rarely exceed 2%.

One of the principal objects of my present invention is to provide a fluid clutch or coupling of the fluid-vortex type which may be operated efficiently for long periods as a speed reducing unit without overheating.

A more particular object of the invention is to provide a new and novel valve arrangement by which any desired or predetermined level of operating fluid may be maintained in the vortex chamber of the coupling with a constant flow of fluid therethrough, as is contemplated by my copending application for patent entitled Variable Speed Rotary Fluid Coupling, filed April 28, 1947 and identified by Serial Number 744,385.

Another object of the invention is to provide a novel form of fluid control means for a fluid coupling of the vortex chamber type by which any predetermined level of operating fluid may be maintained in the vortex chamber of the coupling without interfering with the free circulation of the operating fluid therethrough.

Another object of the invention is to provide an improved control means by which the slip between the vortex chamber forming members in a coupling of the Föttinger type may be varied while the coupling is in operation and entirely independently of the rate of flow of a working fluid through the coupling.

Another object of the invention is to provide an arrangement by which the level of the working fluid in a coupling of the vortex chamber type may be controlled to permit of a rapid change and/or a continued operation at a reduced output speed without overheating.

The foregoing and other objects of the invention, which will be apparent to those skilled in the art, are attained by means of a novel combination and arrangement of parts to be hereinafter described and claimed, and in order that the same may be better understood, reference is had to the accompanying drawings which illustrate the now preferred form of the invention.

Figure 1:
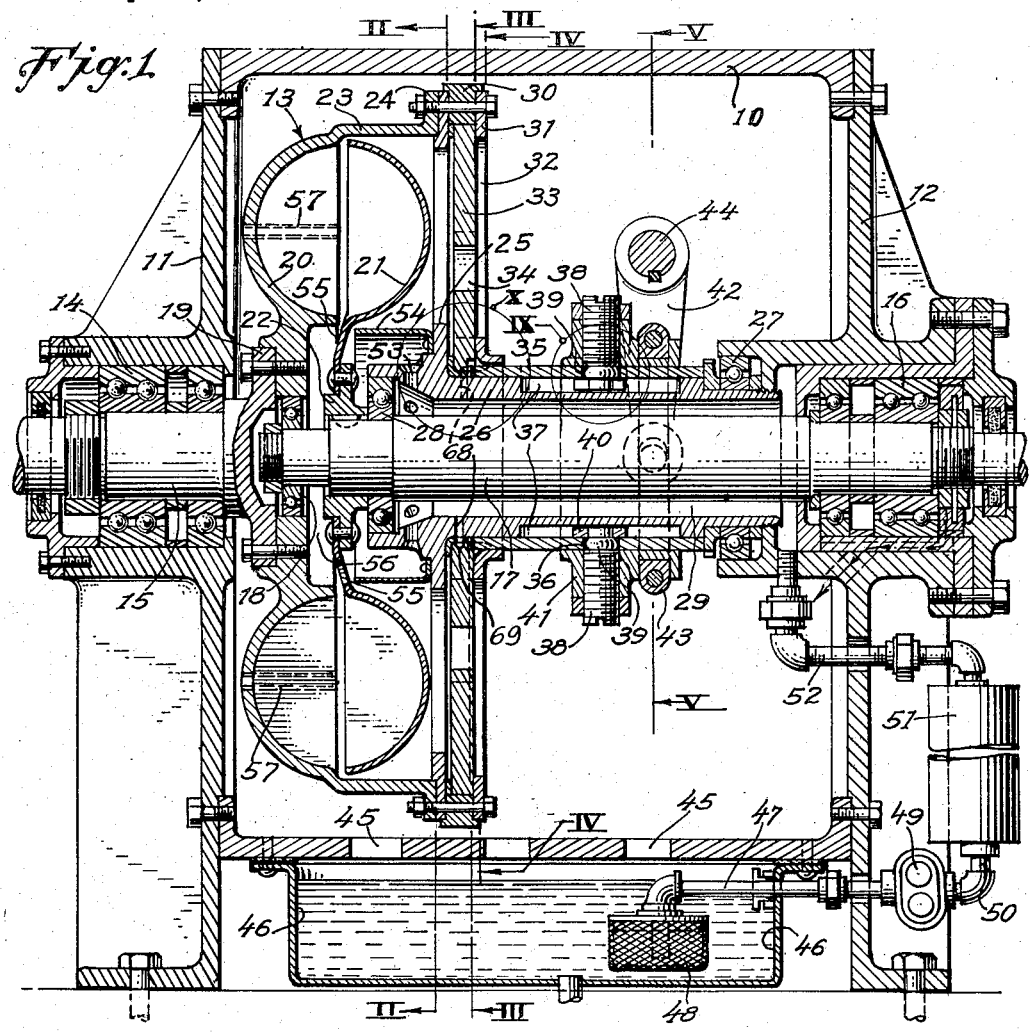
Figure 1 is a fragmentary sectional view taken along the axial center line of a coupling constructed in accordance with the invention.

While the principle of operation of fluid power transmitting devices of the so-called Föttinger or vortex chamber type has long been known, the full capabilities of power transmission devices of this type have only recently been appreciated. An outstanding advantage of these fluid couplings is that they can be used to connect a prime mover directly to a full load without subjecting the prime mover to an excessive overloading during the starting period. Under these conditions the transmission of power from the prime mover to the load is through the fluid medium which circulates, as is well understood, within the vortex chamber of the coupling, and by regulating the amount of such circulating fluid within the vortex chamber it is possible to slowly bring the load up to full speed without overloading or reducing the speed of the prime mover. This means that upon starting such a load considerable slip will exist between the driving and driven elements of the coupling and as a consequence the fluid within the coupling will have a tendency to heat up particularly when a heavy load is carried by the coupling for an abnormal length of time with a considerable differential in the speeds of the coupling members. This heating of the fluid in the vortex chamber is objectionable as such heat must be dissipated by the coupling members and if it becomes excessive the coupling may be irreparably damaged. To remedy and/or compensate for this difficulty, it has been the practice to permit a certain amount of the operating fluid to escape outwardly from the vortex chamber while at the same time a sufficient quantity of cooler fluid is introduced in the vortex chamber in an amount which will compensate for this leakage. Various valve arrangements have been proposed for controlling the flow of fluid through the vortex chamber in this manner, and in other instances a definite clearance has been provided between the driving and driven members of the coupling through which a limited amount of the operating fluid may exhaust into an auxiliary fluid collecting chamber formed as a part of one of the coupling members and from which the excess fluid is collected by a stationary scoop and returned to a supply tank from which it may be again introduced into the vortex chamber by gravity or other suitable means. An objection to the use of this latter arrangement is that the use of such a scoop involves a considerable energy loss which seriously impairs the over-all efficiency of the coupling and at the same time a certain augmentation of the external diameter of the coupling and/or its enclosing casing is necessary, all of which further increases the weight and cost of manufacture of the coupling.

Under other operating conditions, it often also becomes desirable if not in fact necessary to provide a means by which a fluid coupling of the type contemplated may be quickly rendered ineffective and while such an operation might well be accomplished with the various forms of fluid couplings now available by merely shutting off the supply of circulating fluid to the coupling, there is introduced into such an operation the element of a time delay which will be determined and controlled by the very restricted clearances or leakage ports that are provided between the coupling members and through which the operating fluid must escape from the vortex chamber.

Recognizing the above difficulties, I have by my invention provided a new and novel form of valve means by which a uniform and constant flow of operating fluid may be maintained through the vortex chamber while the coupling is in operation and at the same time any desired centrifugal level or quantity of operating fluid may be maintained within the vortex chamber to satisfy the load requirements, and in the event that it is desired to render the coupling inoperative or, in other words, disconnect a load from a prime mover, this can also be accomplished without interfering with a free circulation of the operating fluid through the coupling which will then operate to cool the vortex chamber forming members without transmitting any power therebetween. Another advantage of the invention is that it provides a fluid coupling means that is capable of use with a multi-speed gear transmission such as is used with automobiles in much the same manner as a conventional friction clutch. In such a use, it will be seen that by opening the vortex fluid level controlling valve, as contemplated by the invention, it will be possible to rapidly empty the vortex chamber and thus render the coupling ineffective almost instantaneously, and to re-engage the coupling it will only be necessary to operate the fluid level controlling valve in a reverse manner. This will stop the escape of fluid from the vortex chamber until a sufficient quantity of working fluid has again accumulated in the vortex chamber of the coupling, as will be determined by the level controlling valve, and following this the coupling will continue to operate at a constant level with a renewing flow of operating fluid through the vortex chamber of the coupling at the level thus determined by the final setting of the fluid level controlling valve.

Reference is now made to Figure 1 of the drawings for a general description of the invention which will be followed by a more detailed description of the various parts in connection with the remaining figures of the drawings. In this figure of the drawings, the coupling is shown as enclosed within a housing that has a substantially cylindrical body portion 10 with end closure plates 11 and 12 that form a complete housing within which a fluid coupling designated generally by the numeral 13 operates. The end plate 11 is provided with a bearing 14 which supports a driving shaft 15 that is adapted to be connected to any suitable prime mover. At the other end of the housing the end plate 12 is provided with a bearing 16 that forms a support for a driven shaft 17 which is adapted to be connected to a load to be driven. At its inner end, the driven shaft 17 is also shown as centered in coaxial relation with the driving shaft 15 by means of the bearing 18. The driving shaft 15 has a flange facing 19 to which there is secured a vortex chamber forming member 20 that is adapted to co-operate with an oppositely arranged vortex chamber forming member 21 that is carried by a hub 22 which is keyed to the inner end of the driven shaft 17.

The vortex chamber forming members 20 and 21 are of conventional construction in that they each have a plurality of radially extending vanes between which a fluid will circulate under the influence of centrifugal force as a vortex. In couplings of this type, as is well understood, the operating fluid is introduced into the vortex chamber formed between the coupling members 20 and 21 at a point near their axis of rotation and the amount of operating fluid thus introduced and retained in the vortex chamber will determine the amount of energy which will be transmitted through the fluid from the driving to the driven vortex chamber forming members 20 and 21. In prior art couplings of this type, the clearance between the driving and driven members is generally restricted to prevent as far as possible the escape of operating fluid from the vortex chamber and to compensate for any such loss of fluid there is generally provided a scoop tube or some other means which will function when the coupling is in operation to provide a substantially constant replacement flow of fluid to the vortex chamber. In the present invention, as distinguished from these prior art arrangements, no special provision is made to prevent the escape of operating fluid from the vortex chamber while the clutch is in operation. In other words, the successful operation of my improved coupling contemplates a more or less free circulation of operating fluid through the vortex chamber under all operating conditions.

In order to provide for the above operation, the driving or vortex chamber forming member 20 is shown as having an axially extending cylindrical portion 23 that extends outwardly and over the driven or vortex chamber forming member 21 so as to provide in conjunction with a fluid level controlling means, to be presently described, a fluid collecting chamber or reservoir within which the operating fluid flowing from the vortex chamber may accumulate. The cylindrical portion 23 has an annular flange 24 to which there is bolted an apertured flange 25 which extends outwardly at the inner end of an axially extending cylindrical hub 26 that surrounds and extends in spaced relation about the driven shaft 17. The cylindrical hub portion 26 which carries the apertured flange 25 is journalled at its outer end upon the end plate 12 by means of a bearing 27 and at its inner end it is journalled concentrically with respect to the driven shaft 17 by means of a bearing 28. In this manner the fluid collecting chamber or reservoir formed by the extending cylindrical portion 23 of the driving or vortex chamber forming member 20 is centered and afforded additional support. At the same time, there is provided a passageway 29 around the driven shaft 17 through which the operating fluid may be introduced into the coupling as will also hereinafter appear. Cooperating with the extending cylindrical portion 23 of the driving vortex chamber forming member 20, and in order to complete the above referred to fluid collecting chamber or reservoir and mounted in spaced relation with the apertured flange 25, by means of a spacing ring 30, there is an annular valve plate 31 that has a plurality of radially extending and elongated valve ports 32. Cooperating with the valve plate 31 and mounted within the spacing ring 30 there is a movable annular valve member 33 which has a corresponding plurality of inclined or angularly disposed elongated ports 34 that are adapted to overlap or intersect with the radially extending ports 32 of the annular valve plate 31 and thus form diametrically variable outlet ports for the operating fluid at any centrifugal level which will be determined by a relative displacement of the valve member 33 with respect to the valve plate 31.

As shown in the drawings, the valve plate member 33 has a splined connection with an axially extending sleeve 35 that is rotatably carried by the cylindrical hub portion 26 of the apertured flange 25. This axially extending sleeve 35, as will more clearly hereinafter appear, is provided with oppositely disposed spirally extending slots 36 that are arranged in overlapping relation with oppositely disposed axially extending slots 37 which are formed in the outer surface of the cylindrical hub portion 26. Extending radially through each of the spiral slots 36 and into the axially extending slots 37 there is a radially extending stud 38 which carries rollers 39 and 40 that move respectively in the slots 36 and 37 thereof. These radially extending studs 38 are carried by a floating collar 41 that is adapted to be moved axially by means of a yoke 42 which engages with a trunnioned ring 43 carried by the collar 41. The yoke 42 is mounted upon a shaft 44 which is mounted within and extends externally of the housing at one end so that when the shaft 44 is rocked the sleeve 35 will be caused to turn relative to the cylindrical hub portion 26, which as will be understood is held in fixed relation with the valve plate 31, and thus the annular valve member 33 will be moved relative to the valve plate 31 and change the point at which the angularly disposed slots 34 thereof intersect with the radial slots 32 of the valve plate 31. This will in effect provide a weir-like discharge outlet for the fluid collecting chamber which can be changed to control the amount of operating fluid that will be held in the vortex chamber of the coupling when in operation.

As the operating fluid is discharged through the weir-like discharge outlets provided for by the overlapping radially extending ports 32 and the angularly disposed ports 34 formed, as above described, upon the inner wall of the fluid collecting chamber or reservoir, it will pass through drain outlets 45 provided at the bottom of the cylindrical portion 10 of the housing and accumulate in a sump or fluid supply tank 46. The fluid thus collected will then be re-pumped into the vortex chamber at a rate which will be determined by the load and nature of the coupling. For this purpose and extending into the sump or fluid collecting tank 46 there is a pipe connection 47 having a screened intake head 48 that is connected to the suction side of a fluid circulating pump 49. At the outlet side of the pump 49 there is a further pipe connection 50 that leads to a fluid cooling tank 51 and extending from this fluid cooling tank there is another pipe connection 52 which communicates through the end plate 12 of the housing with the annular conduit or space 29 described above as formed between the driven shaft 17 and the cylindrical extension 26 of the apertured plate 25. At the other end of this annular space, there is a number of radially extending ports 53 through which the fluid thus introduced may flow to the vortex chamber of the coupling. As a means for directing this flow of oil in the manner indicated, the apertured plate 25 is shown as provided with an overhanging annular flange forming member 54 which will serve to direct the introduced fluid through apertures 55 in the hub of the driven vortex chamber forming member 21 and into a space 56 formed at the other side thereof. From this point the fluid will be thrown centrifugally into the vortex chamber, and in order to insure against any back pressure of air within the vortex chamber, I have shown the driving vortex chamber forming member 20 as having axially extending air vents 57 that extend through several of the vanes from the center of the vortex chamber to the space externally of the coupling.

Figure 4:
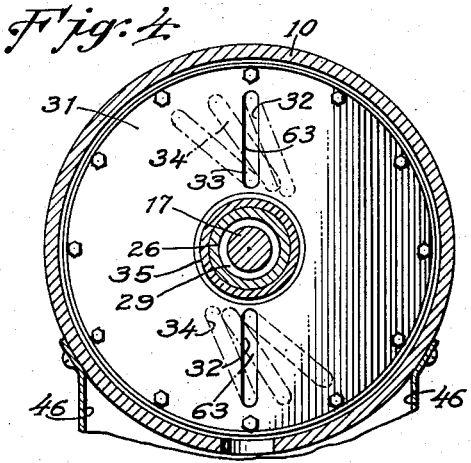

Reference is now made to Figures 2, 3, 4 and 5 of the drawings for a further description of the fluid level controlling means which as indicated above cooperates with the extended portion 23 of the driving or vortex chamber forming member 20 to form a fluid chamber or reservoir into which a counterbalance level of fluid flowing from the vortex chamber is collected. As will be noted in Figure 2, the apertured plate 25 has six apertures 58 which communicate directly with the space about the outside of the driven vortex chamber forming member 21 and when bolted to the outer flange 24 of the driving vortex chamber forming member 20 it will provide a rigid unit. It will be also here noted that the sump or fluid supply tank 46 is formed of pressed metal and secured to the underside of the cylindrical portion 10 of the housing. The end plates 11 and 12 are here shown as extended downwardly to form a base or foundation engaging flange by which the coupling may be mounted upon any suitable support. This sectional view also clearly shows the annular passageway 29 that is provided about the driven shaft and through which the operating fluid is initially introduced into the vortex chamber formed between the driving and driven members 20 and 21 of the coupling. The annular valve member 33, as is more clearly shown in Figure 3, in addition to having the two inclined or angularly disposed slots or ports 34, also has two arcuate recesses or grooves 59 into which oil or other operating fluid is injected centrifugally when the coupling is in operation, and extending inwardly from the middle of these arcuate grooves 59 there are radial groove extensions 60. Communicating with these grooves 60 there are suitable ports 61 (shown dotted) through which oil or other operating fluid is introduced to these grooves as will hereinafter appear. This figure of the drawing also shows the annular valve member 33 as having a plurality of spaced notches 62 in its face and about its inner edge. These notches 62 serve, as will hereinafter appear, to establish a splined connection with the axially extending sleeve 35. In Figure 4 of the drawings, the valve plate 31 is shown as having two oppositely disposed and radially extending ports 32 and when matched with the angularly disposed ports 34 of the valve member 33 there will be provided an outlet aperture 63 which may be varied in its location diametrically with respect of the axis of rotation of the coupling.

Figure 5:
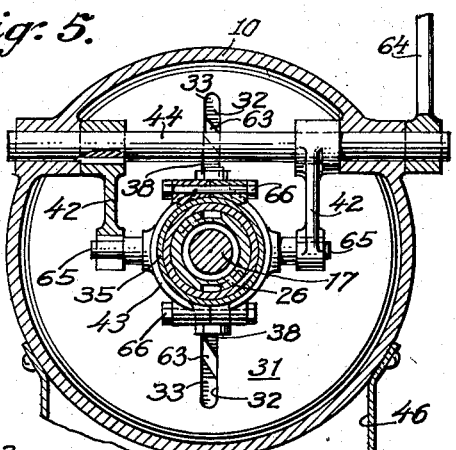

Now, with reference to Figure 5 of the drawings, it will be noted that the shaft 44 upon which the yoke 42 is mounted has an operating lever arm 64 by means of which it may be rocked in one direction or the other. The trunnion ring 43 is also here shown as having oppositely extending trunnions 65 with which the extending ends of the yoke 42 engage. This trunnion ring 43 is formed in two halves that are secured together by bolts 66.

Figure 6:
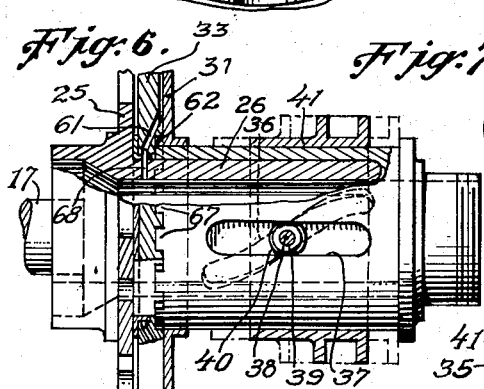
Figure 6 is a fragmentary view partly in section showing a detail of construction.
Figure 7:
Figure 7 is a fragmentary view showing a detail of the valve member employed in my invention.
Figure 9:
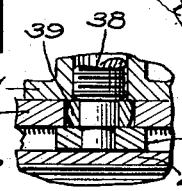
Figure 8:
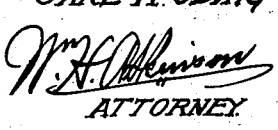
Figure 8 is a perspective view showing one of the valve controlling elements of the invention.

To explain in more detail the spline connection between the valve member 33 and the sleeve 35 by which it is moved, reference is now made to Figures 6 to 9 inclusive of the drawings. As shown in Figure 6, when the coupling is assembled the notches 62, referred to above as formed about the inner edge of the valve member 33, are engaged by a corresponding plurality of extensions or tongues 67 that are formed about the inner end of the axially extending sleeve 35 and when these extending tongues 67 are projected into the notches 62 of the valve member 33, it will be readily seen that any rotary movement imparted to the sleeve 35 will be in turn transmitted to the valve member 33. This turning of the axially extending sleeve 35 relative to the cylindrical hub portion 26 of the end plate 25 is accomplished by a rocking of the shaft 44 and thus imparting an axial movement to the floating collar 41. This will move the rollers 40 carried by the studs 38 axially along the slots 37 formed in the cylindrical portion 26 of the coupling, then as a result of this axial movement of the rollers 40 in the slots 37 the smaller rollers 39 carried by the studs 38 will travel along the spiral slots 36 of the sleeve 35 and thus impart a relative rotary movement thereto which will in turn cause the valve plate 33 to move in unison therewith. In connection with this showing, it should be stated that the pitch of the spiral slots 36 of the sleeve 35 is such as to produce an angular movement of the annular valve member 33, a distance sufficient to carry the angularly disposed ports thereof throughout the entire range of the radially disposed slots 32 of the valve member 31.

Figure 10:
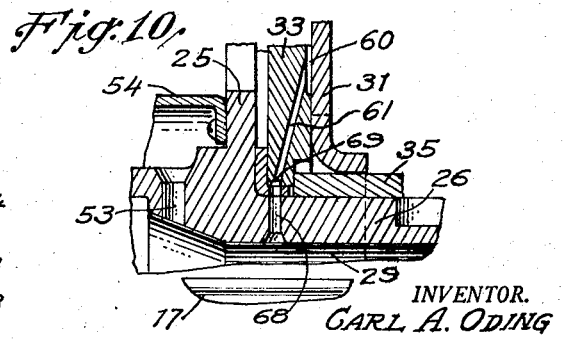
Figures 9 and 10 are fragmentary sectional views taken respectively within the circles IX and X of Fig. 1 showing details of the invention.
Figure 2:
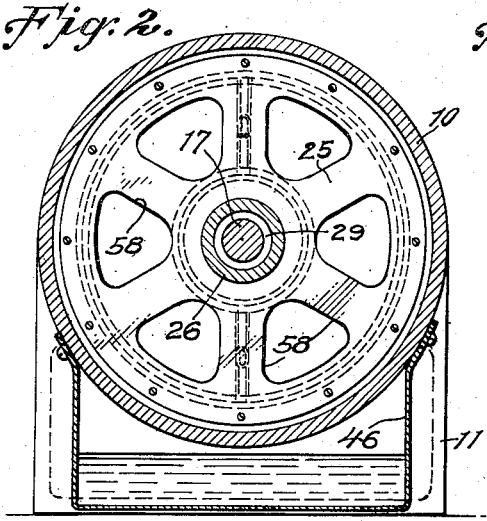
Figures 2, 3, 4 and 5 are reduced and transverse sectional views taken along similar respectively designated section lines as applied to Figure 1 of the drawings.
Figure 3:
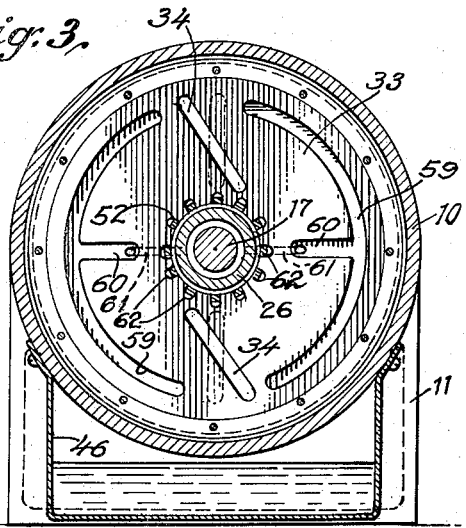

Reference is now made to Figure 10 of the drawings for a more detailed description of the manner in which oil or other operating fluid is introduced into the grooves 59 and 60, previously referred to, as formed in the face of the annular valve member 33. As here indicated, the cylindrical portion 26 of the coupling is provided with radially disposed fluid ports 68 that extend outwardly from the space 29 between the driven shaft 17 and the cylindrical hub 26 of the coupling and when oil under pressure is flowing through the space 29 some of this oil will be projected through the ports 68 to a short arcuate groove 69, two of which extend about the inner surface of the valve member 33. The length of the grooves 69 will be determined by the extent of the angular movement of the valve member 33. Extending outwardly from these arcuate grooves 69 there are the other ports 61 which communicate with the inner ends of the grooves 60 formed in the face of the valve member 33. In this manner, there is established a path for a flow of oil or other fluid under pressure into the space between the valve plate 31 and the valve member 33 which will counterbalance to a degree the pressure exerted by the fluid flowing from the vortex chamber and also insure for a proper lubrication which will prevent any seize or freezing between these parts. The provision for the flow of a portion of the operating fluid into the space between the valve plate 31 and the valve member 33 from a point near the center of rotation of the coupling in the manner shown, subjects the introduced fluid to the pressure established at this point by the fluid circulating means 49 and also the forces resulting from centrifugal action as it flows outwardly between the opposed faces of these two members. With the valve member 33 grooved as indicated there will also be provided a quantity of oil at these points which will be subjected to centrifugal force. As a result there is established a pressurized film between these parts that will substantially counterbalance the pressure exerted upon the valve member 33 by the fluid within the fluid accumulating chamber when the coupling is in operation. This is evidenced by the fact that, in actual practice, it has been found that the operation of the valve member 33 is effected with considerably less mechanical force after the coupling is in operation than when the coupling is initially started with practically no fluid under pressure between these parts.

Figure 11:
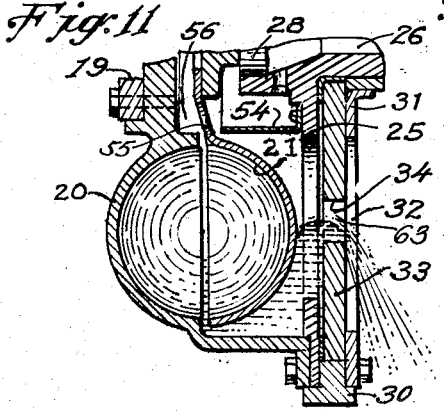
Figure 11 is a diagrammatic view illustrating the operation of my improved coupling.

The operation of my improved coupling will now be described in connection with Figure 11 of the drawings. As indicated, it will be seen that as an operating fluid is introduced into the vortex chamber formed between the driving and driven members 20 and 21 of the coupling, it will circulate therebetween in the form of a vortex and under normal operating conditions a certain amount of this fluid will be thrown outwardly and escape through the space necessarily provided between the driving and driven members 20 and 21. This escaping fluid will then accumulate within the auxiliary fluid collecting chamber or reservoir which is formed immediately about the driven vortex chamber forming member 21. As this fluid is collected the valve forming plate 31 and the valve member 33 in association with the extending flange 23 upon the driving or vortex chamber forming member 20 will operate to determine the centrifugal level or amount of such fluid which will be retained therein. In other words, the centrifugal level or amount of fluid which can accumulate will be determined by the point at which the angularly disposed slots 34 of the valve member 33 intersect the slots 32 of the valve plate 31. In this figure of the drawings, the liquid is indicated as having accumulated and maintained centrifugally at a level corresponding to approximately one-half of the radial depth of the fluid collecting chamber or reservoir. This condition of fluid level, as here illustrated, will exist entirely around the outer side of the vortex chamber forming or driven member 21. As a result there will be established a counter-balancing fluid pressure that will tend to retard the escape of fluid from between the vortex chamber forming members 20 and 21. At the same time, with a constant flow of fluid entering the vortex chamber, there will necessarily be an excess of fluid which will continue to flow outwardly from the auxiliary collecting chamber through the intersecting ports 32 and 34 of the valve plate 31 and the valve member 33. Under these conditions, this flow of fresh and cooled fluid will first circulate in the vortex formed between the driving and driven members 20 and 21 and as a result a uniform cooling circulation of fluid can be established and maintained within the vortex chamber. At this point it should be stated that the fluid discharge outlet formed by the intersecting ports 32 and 34 of the valve plate 31 and the valve member 33 are of such a width that there will be provided a discharge for the oil from the auxiliary fluid collecting chamber or reservoir which will take care of any delivery of the fluid provided for by the circulating pump 49. Therefore, it will be seen that irrespective of the rate of flow of fresh cooled operating fluid to the coupling there will be no danger of an over accumulation of operating fluid in the vortex chamber. It is also possible to entirely disconnect the coupling members 20 and 21 even while maintaining a steady flow of cooling fluid therethrough by adjusting the overlapping or intersecting ports 32 and 34 of the valve plate 31 and the valve member 33 so as to intersect at the extreme outer limits of the ports 32 of the valve member 31. Under these conditions no accumulation of fluid will occur in the auxiliary fluid collecting chamber or reservoir and therefore no counterbalancing level of fluid will be established to retard or prevent the escape of fluid from the vortex chamber.

As shown in the drawings and described above, the valve forming ports of the valve member are preferably disposed radially with respect to their axis of the coupling and with the valve ports 32 of the valve plate 31 inclined at an angle with respect thereto. It will be understood, however, that the dispositions of these overlapping ports 32 and 34 may be reversed so as to provide the angularly disposed ports in the valve member 31 with radially extending ports 34 in the valve member 33. It is also conceivable that instead of the substantially straight and inclined ports that these ports 32 and 34 may be of other configurations. For example, one or the other of these ports may be of curved configuration with their centers of curvature located eccentrically with respect to the axis of the coupling.

While I have for the sake of clearness and in order to disclose the invention so that the same can be readily understood, described and illustrated a specific form and arrangement, it is to be understood that the invention is not limited to the specific forms described, but may be embodied in other forms that will suggest themselves to persons skilled in the art. It is contemplated that the configuration of the valve plate 31 and the valve member 33 may depart from the form of flat annular discs and may be of stamped sheet metal construction as is now the practice in the construction of couplings of this type. It is believed that this invention is new and it is desired to claim it so that all sorts of changes as come within the scope of the appended claims are to be considered as a part of this invention.

Having thus described my invention, what I claim and desire to secure by Letters Patent is:

1. In a fluid coupling of the vortex chamber type, the combination of driving and driven coupling members arranged in opposed relation and forming a fluid vortex supporting chamber, one of said coupling members being extended and constructed to form an auxiliary chamber externally of the vortex chamber formed by said coupling members and into which fluid discharged from said vortex chamber may accumulate, an annular plate secured to the extended portion of said latter coupling member and forming an end wall for said auxiliary chamber, said annular plate having a plurality of radially extending elongated ports formed therein, an annular valve member rotatable with and mounted in cooperating relation with said annular plate having a plurality of angularly disposed ports arranged in intersecting relation with the radially extending ports of said annular plate, and means for rotating said annular valve member relative to said annular plate to vary the point of intersection between the cooperating ports thereof while the coupling is in operation and thus determine the level of fluid which can centrifugally accumulate within said auxiliary chamber.

2. In a fluid coupling of the vortex chamber type, the combination of driving and driven coupling members arranged in opposed relation and forming a fluid vortex supporting chamber, one of said coupling members being constructed to form an annular chamber co-axial with said vortex chamber into which fluid flowing from the vortex chamber may accumulate while the coupling is in operation, an annular valve plate arranged and adapted to form an end wall for said annular chamber, said annular valve plate having a plurality of radially extending elongated valve ports formed therein, an annular plate-like valve member rotatable with and mounted in sealing relation with said annular valve plate having a corresponding number of inclined and elongated ports arranged to intersect the radially extending ports of said annular valve plate, and means for turning said annular plate-like valve member relative to said annular valve plate when the coupling is in operation, whereby a fluid discharge port will be established for the escape of fluid from said auxiliary chamber at different levels from within said auxiliary chamber as will be determined by the displacement of said annular plate-like valve member with respect to said annular valve plate.

3. In a fluid coupling of the vortex chamber type, the combination of driving and driven coupling members arranged in opposed relation and forming a fluid vortex chamber, one of said coupling members being extended to form an annular chamber in axial alignment with said vortex chamber and into which fluid may flow from the vortex chamber formed between said coupling members, a flat annular end plate secured to and forming an end wall for said auxiliary chamber, said annular end plate forming a valve seating surface extending entirely around its inner side and having a plurality of elongated valve ports extending therethrough, a flat annular valve member mounted in sealing engagement with the valve seating surface of said annular end plate having elongated ports disposed in intersecting relation with the elongated ports of said annular end plate, and means for turning said valve member about the axis of the coupling and relative to said annular end plate while maintaining the ports in said valve member in intersecting relation with the ports in said annular end plate, whereby a fluid outlet will be established from the interior of said annular chamber at different points inward from the outer periphery of said coupling members as will be determined by the relative displacement of said valve member with respect to said annular end plate.

4. In a fluid coupling of the vortex chamber type, the combination of driving and driven coupling members arranged in opposed relation and forming a fluid vortex supporting chamber, one of said coupling members being extended over the other of said members to form an auxiliary chamber co-axial with said vortex chamber into which fluid may flow from the vortex chamber formed between said coupling members, an annular valve plate secured to the extending portion of said latter coupling member and forming the end wall of said auxiliary chamber, said annular valve plate having a radially extending elongated valve port formed therein, an annular plate-like valve member rotatable with and mounted in sealing relation with said annular valve plate having an elongated angularly inclined port disposed in intersecting relation with the radially extending port of said annular valve plate, and means for turning said annular plate-like valve member relative to said annular valve plate while maintaining the inclined port in said plate-like valve member in intersecting relation with the port in said valve plate, whereby a fluid discharge outlet port will be established from the interior of said auxiliary chamber at different diametrically located points between the limits of said vortex chamber as will be determined by the relative displacement of said annular plate-like valve member with respect to said annular valve plate.

5. In a fluid coupling of the character described, the combination of an enclosing housing having a fluid collecting sump, a driving shaft extending through an end wall of said housing and having a vortex chamber forming member disposed within said housing, a driven shaft extending co-axially with said driving shaft and extending through an opposite wall of said housing and having a vortex chamber forming member disposed in cooperating relation with the vortex chamber forming member carried by said driving shaft, the vortex chamber forming member carried by said driving shaft being extended to form a co-axial fluid accommodating chamber into which fluid escaping at the outer perimeter of said vortex chamber may accumulate, the end wall of said fluid accommodating chamber having a plurality of radially extending elongated ports formed therein, an annular valve member having a plurality of inclined elongated ports formed therein and disposed in intersecting relation with the radially extending ports in the end wall of said fluid accumulating chamber, a fluid circulating means for maintaining a continuous flow of fluid from said sump to the vortex chamber formed between said coupling members, and means for turning said annular valve member about the axis of said coupling and relative to the end wall of said fluid accumulating chamber to diametrically vary the point of intersection between the radial ports of said end wall and the inclined ports of said valve member, whereby the amount of working fluid maintained in the vortex chamber while in operation will be determined by the level of the fluid collected in said fluid accommodating chamber as established by the location of the overlapping ports of said end wall and said valve member.

6. In a fluid coupling of the character described, the combination of an enclosing housing, a driving shaft extending through an end wall of said housing and having a vortex chamber forming member disposed within said housing, a driven shaft extending co-axially with said driving shaft and extending through an opposite wall of said housing and having a vortex chamber forming member disposed in cooperating relation with the vortex chamber forming member carried by said driving shaft, the vortex chamber forming member carried by said driving shaft being extended axially over the vortex forming member carried by said driven shaft, an annular plate-like member secured to the extended portion of said latter member and forming therewith a rotatable fluid collecting chamber into which fluid escaping at the outer perimeter of said vortex chamber may collect, said annular plate-like member having a plurality of radially extending elongated openings forming valve ports therein, an annular valve member having a similar number of relatively inclined elongated ports arranged to intersect the radial ports in said annular plate-like member, a fluid circulating means for maintaining a continuous flow of operating fluid to the vortex chamber formed between said coupling members, and means for turning said annular valve member relative to said annular plate-like member, whereby the point of intersection between the radial ports of said plate-like member and the inclined ports of said valve member may be adjusted to determine the level of the fluid collected in said chamber and thus control the amount of working fluid remaining in the vortex chamber of the coupling.

7. In a fluid coupling of the vortex chamber type, the combination of driving and driven coupling members arranged in opposed relation and forming a fluid vortex supporting chamber, one of said coupling members being extended and constructed to form an auxiliary chamber rotatable with and externally of the vortex chamber formed by said coupling members and into which fluid discharged from said vortex chamber may accumulate immediately in back of said driven coupling member, an annular plate secured to the extended portion of said latter coupling member and forming an end wall for said auxiliary chamber, said annular plate having a plurality of elongated ports formed therein through which fluid may flow from said auxiliary chamber, an annular valve member mounted in cooperating relation with said annular plate having a plurality of ports disposed at an angle to and in intersecting relation with the elongated ports of said annular plate, and means for turning said annular valve member relative to said annular plate to vary the point of intersection between the cooperating ports thereof while the coupling is in operation to thus determine the level of fluid which will centrifugally accumulate within said auxiliary chamber.

8. In a fluid coupling of the vortex chamber type, the combination of driving and driven coupling members arranged in opposed relation and forming a fluid vortex supporting chamber, one of said coupling members being extended and constructed to form an auxiliary chamber externally of the vortex chamber formed by said coupling members and into which fluid discharged from said vortex chamber may accumulate immediately behind said driven coupling member, an annular plate secured to the extended portion of said latter coupling member and forming a transversely disposed end wall for said auxiliary chamber, said annular plate having a plurality of outwardly radiating elongated ports formed therein, an annular valve member rotatable with and mounted in cooperating relation with said annular plate having a corresponding number of elongated ports inclined at an angle and in intersecting relation with the elongated ports of said annular plate, and means for turning said annular valve member relative to said annular plate to vary the point of intersection between the cooperating elongated ports thereof while the coupling is in operation to thus determine the level of fluid which will centrifugally accumulate within said auxiliary chamber.

9. In a fluid coupling of the character described, the combination of a driving shaft having a vortex chamber forming member secured at its end, a driven shaft extending co-axially with said driving shaft and having a vortex chamber forming member disposed in cooperating relation with the vortex chamber forming member carried by said driving shaft, the vortex chamber forming member carried by said driving shaft being extended axially over the vortex forming member carried by said driven shaft, an annular plate-like member secured to the extended portion of the vortex chamber forming member upon the driving shaft and forming therewith a fluid collecting chamber into which fluid escaping at the outer perimeter of said vortex chamber may collect immediately behind the vortex chamber forming member carried by the driven shaft, said annular plate-like member having a flat inner facing and a plurality of elongated openings forming valve ports therein, an annular valve member having a similar number of elongated ports arranged to intersect the ports in said annular plate-like member and disposed in contact with the inner facing of said plate-like member, a fluid circulating means for maintaining a continuous flow of operating fluid to the vortex chamber formed between said coupling members, means for turning said annular valve member relative to said annular plate-like member, whereby the point of intersection between the elongated ports of said plate-like member and the corresponding elongated ports of said valve member may be adjusted to determine the level of the fluid which will collect in said fluid collecting chamber, and means forming a conduit through which a portion of the fluid flowing from said fluid circulating means to the vortex chamber will be by-passed to the space between the contacting faces of said annular plate-like member and said valve member.

10. In a fluid coupling of the character described, the combination of a driving shaft having a vortex chamber forming member secured upon its ends, a driven shaft extending co-axially with said driving shaft having a vortex chamber forming member disposed in cooperating relation with the vortex chamber forming member carried by said driving shaft, the vortex chamber forming member carried by said driving shaft being extended axially over the vortex chamber forming member carried by said driven shaft, an annular plate-like member secured to the extended portion of said latter member and forming therewith a fluid collecting chamber into which fluid escaping at the outer perimeter of said vortex chamber may collect, said annular plate-like member having a plurality of radially extending elongated openings forming valve ports therein, an annular valve member disposed in sealing relation with said plate-like member having a similar number of relatively inclined elongated ports that are arranged to intersect the radial ports in said annular plate-like member, said annular valve member also having recesses in its annular plate engaging surface, a fluid circulating means adapted to maintain a continuous flow of operating fluid to the vortex chamber formed between said coupling members, and means forming a fluid conduit through which a portion of the fluid flowing from said fluid circulating means to the vortex chamber will be by-passed to the recesses in the annular plate engaging face of said valve member.

11. A power transmitting rotary fluid coupling of the kinetic type, comprising a pair of coaxially opposed vortex chamber forming members, a rotatable reservoir having a flat transversely disposed end wall rotatable with one and surrounding the other of said vortex chamber forming members, means for introducing a continuous flow of operating fluid into the vortex chamber formed between said coaxially opposed members, the flat transversely disposed end wall of said rotatable reservoir having an elongated radially extending port which forms a discharge outlet through which fluid accumulating in said reservoir by centrifugal force may escape, an annular plate-like valve member mounted within said rotary reservoir having an inclined elongated port arranged to intersect the radial port in said end wall, and means for rotating said annular plate-like valve member relative to said end wall when the coupling is in operation, whereby the point of intersection between the radial port of said end wall and the inclined port of said plate-like valve member may be varied to provide a fluid discharge outlet for said reservoir at different points between the inner and outer radial limits of the vortex chamber.

12. In a power transmitting rotatable fluid coupling of the character described, the combination of a pair of coaxially opposed vortex chamber forming members, a fluid accumulating housing carried by and rotatable with one of said members having an end wall disposed transversely with respect to its axis of rotation, said end wall having a flat annular valve seating surface with an elongated radially extending outlet port through which fluid may be centrifugally discharged from said fluid accumulating housing, means for maintaining a flow of operating fluid to the vortex chamber formed between said members, a valve member mounted in sealing engagement with the annular valve seating surface of said end wall and in cooperating relation with the radially extending outlet port thereof for varying the effective location of the fluid discharge point of said radially extending outlet port with respect to the axis of rotation, means for moving said valve member relative to said end wall while the coupling is in operation, and a conduit communicating with the flow of operating fluid through which operating fluid will be bypassed and form a lubricating film between the engaging faces of said valve member and the ported end wall of said housing.

CARL A. ODING.

References Cited in the file of this patent

UNITED STATES PATENTS

| Number | Name | Date |
|---|---|---|
| 2,187,656 | Kiep et al. | Jan. 16, 1940 |
| 2,557,894 | Siesel | June 19, 1951 |